7140X
A. Hale,
Cotton Press.
Patented June 26, 1832.
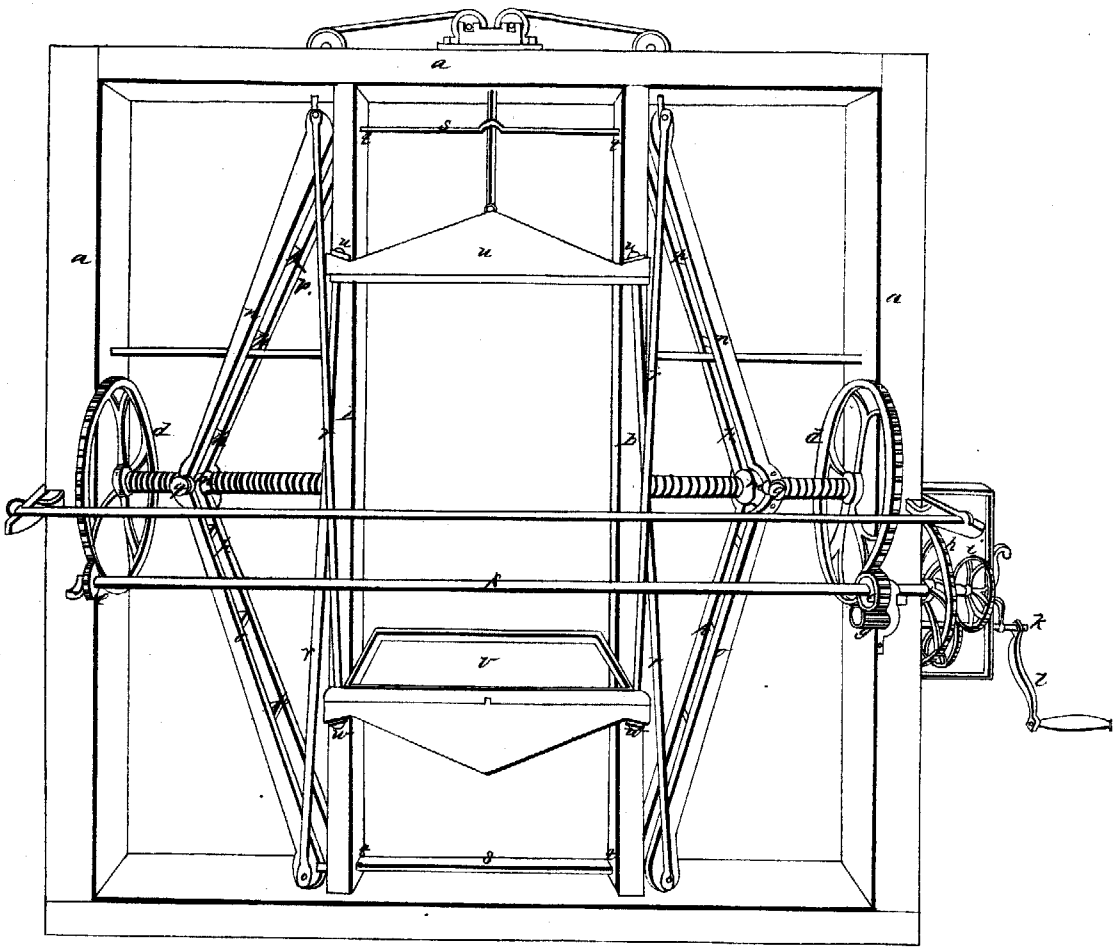
AM. PHOTO-LITHO. CO. N.Y. (OSBORNE'S PROCESS)

X7140 June 26.1832

Aaron Hale of Boston Massachusetts
Letters Patent

The Schedule referred to in these Letters Patent and making part of the same containing a description in the words, of the said Aaron Hale himself of his improvement in the Standing press called the Boston Press.

To all persons to whom these presents shall come, Be it known that I. Aaron Hale of the City of Boston, County of Suffolk and Commonwealth of Massachusetts. mechanic, have invented, constructed made and applied to use a new and useful improvement in the Standing Press, called the Boston Press. and that the following is a full and exact description of the construction and operation of the said machine as invented or improved by me. I make a strong timber frame of four pieces including seven feet in the clear. The upright pieces are six inches thick, the top and bottom pieces are four inches thick, and they are each and all two feet wide. There are two other pieces which serve for platten and toggle guides. about 9 inches by 3. framed into the top and bottom pieces standing upright 3 feet apart and parallel with the other uprights. These four uprights are perforated horizontally and in the same line for the purpose of receiving the pivots of the toggle screws. I make and use two toggle screws, they are 3 feet long. and one & a half inch in diameter. they have a pivot well turned on each end & are fitted to the holes aforesaid. which are thro the centre of each upright piece. On the end of each toggle screw which plays in the outside upright piece and close to the pivot is made fast a dentated wheel 3 feet diameter: for the purpose of revolving the toggle screws. These wheels are driven by pinion wheels about seven inches diameter fixed upon a long arbor extending from one great wheel to the other, on the backside of the machine.

One pinion wheel is made to match and drive the great wheel directly, but the other is made to match and drive an intermediate pinion which matches and drives the great wheel, by which means the direction of the great wheel is inverted. On the right hand side or end of the machine; the aforesaid long arbor extends thro the box so far as to admit two other wheels

X 7140 to be made fast to it, about three inches from each other, the outer one being about half the diameter of the other: Then by means of a bridge made fast in the outside of the upright post a crank arbor is fitted, parallel to the aforesaid long arbor, having elongated pivotz so that it may slide ena wise about three inches for the purpose of shifting gearingz. It haz two wheelz fixed upon it, one of which iz equal in diameter to that of the largest wheel on the long arbor and the other iz so large as to extend to and drive the smaller wheel on the extended end of the long arbor, so that when these are in gear, the other wheels are out of gear, and so alternately — By which meanz the motionz of the machine, may be accelerated or retarded at option. On the last mentioned arbor iz a crank by which the machine iz moved. On each large screw first mentioned a strong spherical nut having pivotz on opposite sidez in a line with each other; about six inches long and one and a half inch in diameter. There are two toggle jointz, one on each toggle screw; sus pended in an upright position; on the pivotz of the spherical nutz.

Each arm of the togglez iz three feet long one foot wide and two inches and a half inch thick either solid or open work somewhat like a sec tion of a ladder having three slatz or roundz acrosz. The outside slatz being six inchez from the endz of the side barz. The inner endz of the side barz are excavated acrosz like common pivot boxez and fitted to the pivot of the spherical nutz and then held and supported by small hingez screwed fast to the edgez of the toggle barz. The outmost endz are a little enlarged somewhat like one side of a Butt hinge joint, and bored thro large enough to receive a bolt two inches diameter. These boltz are fifteen inchez long and project on each side of the togglez far enough to receive the headz of the platen rodz. there are eight platen rodz they are six feet long and one inch and a half thick, all formed alike One end of each rod iz enlarged and perforated so az to fit and swivel on one end of the aforesaid Boltz. The other endz have screw threadz cut on them to the distance of six inchez, and two strong nutz fitted to each one. Two of these rodz are swivelled on the upper end of each toggle hanging

X7140 downwards. and two swivelled on the lower end of each toggle standing up-
wards. the upper ends of the toggles are connected together by a round rod
the same size of the platen rods perforated at each end and swivelled on
the aforesaid bolts at the middle of them; and the lower ends of the
toggles are connected by a similar rod and in the same manner. these
rods being just so long as to keep the outmost ends of the toggles in contact
with the platen and toggle guides. These rods pass thro and slide up &
down in mortises, made thro the platen and togle guides for that
purpose. There are two platens three feet long and two feet wide and of
such thickness as to render them sufficiently strong. they have a hole dril
led thro' each corner of a proper size to receive the screw end of a pla-
ten rod. and they have a recess cut in each end of an exact size of the
platen and toggle guides and fitted to them that they may slide up and
down without any end chase or lateral play. One platen is a little wi-
der than the other which is suspended on the four platen rods descending
from the uppermost ends of the toggles. A nut is first screwed on the
end of each rod. the platen is then placed face side uppermost. and
each rod placed in its respective corner; and a nut screwed on underneath
the platen. The other four rods are next armed with the shoulder nuts.
the platen placed on them with the face side downwards and nuts screw-
ed on to confine it there. The platens are adjusted when their faces are
parallel to each other and perpendicular to their line of motion. For a
further support of the frame I insert a strong brace across each corner
which is made tight by screwing a nut on each end on the outside of
the frame: What I claim as my Invention and improvement
in the above described machine is the construction and arrangement
of those parts which connect the platens and toggles and the advanta-
ges which result from such arrangements.

In testimony that the above is a true specification and description
of my said improvement. I have hereunto set my hand this 28 day
of May in the year of our Lord one thousand eight hundred & thirty two.

Witness { John Dwight
{ Francis O Watts }

Aaron Hale ([illegible]) ([illegible])